(12) United States Patent
Miyazaki et al.

(10) Patent No.: US 10,437,127 B2
(45) Date of Patent: Oct. 8, 2019

(54) ELECTROCHROMIC APPARATUS AND METHOD OF DRIVING ELECTROCHROMIC DEVICE, AS WELL AS OPTICAL FILTER, LENS UNIT, IMAGING APPARATUS AND WINDOW MEMBER

(71) Applicant: CANON KABUSHIKI KAISHA, Tokyo (JP)

(72) Inventors: Kazuya Miyazaki, Kunitachi (JP); Jun Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 15/920,687

(22) Filed: Mar. 14, 2018

(65) Prior Publication Data

US 2018/0275477 A1 Sep. 27, 2018

(30) Foreign Application Priority Data

Mar. 22, 2017 (JP) .................. 2017-055343

(51) Int. Cl.
| | | |
|---|---|---|
| *G02F 1/153* | (2006.01) | |
| *G02F 1/163* | (2006.01) | |
| *G03B 11/00* | (2006.01) | |
| *E06B 3/67* | (2006.01) | |
| *E06B 9/24* | (2006.01) | |
| *G02F 1/155* | (2006.01) | |
| *G02F 1/1514* | (2019.01) | |

(52) U.S. Cl.
CPC .......... *G02F 1/1533* (2013.01); *E06B 3/6722* (2013.01); *E06B 9/24* (2013.01); *G02F 1/155* (2013.01); *G02F 1/163* (2013.01); *G03B 11/00* (2013.01); *E06B 2009/2464* (2013.01); *G02F 2001/15145* (2019.01)

(58) Field of Classification Search
CPC ........ G02F 1/1533; G02F 1/155; G02F 1/163; G02F 2001/15145; G03B 11/00; E06B 9/24; E06B 3/6722; E06B 2009/2464
USPC .................. 359/265–275; 345/105
See application file for complete search history.

(56) References Cited

U.S. PATENT DOCUMENTS 8,964,107 B2 * 2/2015 Miyazaki ................. G03B 9/02
348/370
9,678,402 B2 6/2017 Yamamoto
(Continued)

FOREIGN PATENT DOCUMENTS

JP 61-245143 A 10/1986

*Primary Examiner* — Tuyen Tra
(74) *Attorney, Agent, or Firm* — Venable LLP

(57) ABSTRACT

An electrochromic apparatus comprises an electrochromic device and a drive unit operating for normal drive and heating drive of the electrochromic device. The electrochromic device comprises a pair of electrodes and an electrochromic layer including at least an electrochromic material and a solvent. Each of the paired electrodes has at least a pair of power supply sections on a surface thereof. The pair of power supply sections include a first power supply section and a second power supply section arranged oppositely relative to the first power supply section on the surface. The drive unit operates for the heating drive such that the electrochromic layer is heated by applying an alternating voltage between the pair of power supply sections of each of the paired electrodes so as to put any oppositely disposed positions of the paired electrodes in phase with each other.

18 Claims, 11 Drawing Sheets

(56) References Cited

U.S. PATENT DOCUMENTS

| | | | |
|---|---|---|---|
| 10,295,821 B2 * | 5/2019 | McCabe | ................. A61F 9/029 |
| 2015/0212382 A1 | 7/2015 | Miyazaki | |
| 2016/0041447 A1 | 2/2016 | Yamamoto et al. | |

* cited by examiner

ELECTROCHROMIC APPARATUS AND METHOD OF DRIVING ELECTROCHROMIC DEVICE, AS WELL AS OPTICAL FILTER, LENS UNIT, IMAGING APPARATUS AND WINDOW MEMBER

BACKGROUND OF THE INVENTION

Field of the Invention

The present invention relates to an electrochromic apparatus and a method of driving an electrochromic device as well as to an optical filter, a lens unit, an imaging apparatus and a window member.

Description of the Related Art

An electrochromic (to be also referred to as EC) device is a device comprising a pair of electrodes and an EC layer arranged between the pair of electrodes. As a voltage is applied between the pair of electrodes of an EC device to cause reduction/oxidation to take place in the EC compound in the EC layer, there arises a change in the spectral transmittance of the EC device within the visible light region, thereby making it possible to adjust the visible light amount passing through the EC device.

The demand for variable ND filters to be used for motion picture taking apparatus comprising a solid state imaging device has ever been increasing in recent years because the optical density in the device can steplessly be adjusted by means of a variable ND filter. While many optical devices employing liquid crystal or inorganic EC thin film have been proposed to date in this field of application, they still have room for improvement in terms of light intensity adjustment range, reliability and so on. On the other hand, optical devices employing organic EC molecules have a wide light intensity adjustment range and the spectral transmittance thereof can relatively easily be designed. These and other advantages provide optical devices employing organic EC molecules with a promising future in the field of application of variable ND filters to be mounted in imaging apparatus.

An EC device that employs organic EC molecules comprises a pair of electrodes and an electrochemically active anodic material and an electrochemically active cathodic material arranged between the pair of electrodes. A material having an EC property or a property of producing an active absorption band in the visible light region by way of electrochemical reduction/oxidation is employed for at least either of the above described materials. With such an arrangement, an oxidation reaction of the anodic material and a reduction reaction of the cathodic material simultaneously take place on the pair of electrodes to produce a closed circuit in the device so as to allow an electric current to flow through the circuit. However, since an EC device employing organic EC molecules utilizes oxidation/reduction reactions of molecules in a solution phase, the response time relating to increase or decrease of optical density depends on the ambient temperature in principle. More specifically, the response time becomes very long in a low temperature environment because the mass transfer of reacting molecules is retarded, whereas the response time conversely becomes very short in a high temperature environment.

The variable ND filter or the like incorporated in an image apparatus is required to operate smoothly without any problem even in a low temperature environment. Therefore, the EC device of the filter is preferably heated to a temperature level that allows the EC device to operate without delay. A technique of electrically energizing the EC medium to directly heat the EC medium is one of the known techniques for heating an EC device. Japanese Patent Application Laid-Open No. S61-245143 (Patent Literature 1) describes a technique of connecting at least one of the electrodes of an EC device to a heating power source for the purpose of electrically energizing the electrode and heating the EC mass layer formed on the electrode.

When heating the EC medium by electrically energizing the electrode, a voltage that is relatively high if compared with the drive voltage may be applied. While the effective energizing/heating voltage that is required for the above-described purpose varies depending on the configuration of the electrode, that of the EC medium and other factors, a voltage that may maximally be about ten times of the drive voltage, which is normally about 1V, may be required for a solution type EC device. Now, assume here that one of the electrodes is selected and energized/heated. As a voltage higher than the drive voltage is applied to the selected one of the electrodes, an electric potential distribution is produced in the electrode surface and the anode material becomes colored at the high potential side, while the cathode material becomes colored at the low potential side. At this time, since a voltage higher than the normal drive voltage is applied to the EC molecules, the EC molecules are subjected to higher order oxidation or higher order reduction and brought into an even more unstable condition. Particularly, if the energizing heating is sustained for a prolonged period of time, degradation of the material may need to be worried about.

On the other hand, the EC mass layer in the Patent Literature 1 is a layer of inorganic thin film formed on a transparent electrode and therefore there does not arise any situation where both the anodic material and the cathodic material become colored in the surface unlike the above described instance of a solution type EC device. Furthermore, Patent Literature 1 does not reveal any idea of conducting an energizing/heating operation in any arbitrary situation including a situation where coloring operation takes place.

SUMMARY OF THE INVENTION

The object of the present invention is to provide a solution type EC apparatus that shows an excellent response time even in a low temperature environment as the apparatus is designed to heat the EC layer of the EC device it comprises so as not to adversely affect the coloring state of the EC device. An electrochromic apparatus according to the present invention comprises an electrochromic device and a drive unit operating for normal drive and heating drive of the electrochromic device, the electrochromic device comprising a pair of oppositely disposed electrodes and an electrochromic layer arranged between the pair of electrodes, the electrochromic layer including at least an electrochromic material and a solvent, each of the paired electrodes having at least a pair of power supply sections on a surface thereof, the pair of power supply sections including a first power supply section and a second power supply section arranged oppositely relative to the first power supply section on the surface, wherein the drive unit is configured to operate for the heating drive such that the electrochromic layer is heated by applying an alternating voltage between the pair of power supply sections of each of the paired electrodes so as to put any oppositely disposed positions of the paired electrodes in phase with each other.

A method of driving an electrochromic device according to the present invention is a method of driving an electrochromic device comprising a pair of oppositely disposed electrodes and an electrochromic layer arranged between the pair of electrodes, the electrochromic layer including at least an electrochromic material and a solvent, each of the paired electrodes having at least a pair of power supply sections on a surface thereof, the pair of power supply sections including a first power supply section and a second power supply section arranged oppositely relative to the first power supply section on the surface, the method including a step of driving the electrochromic device to operate such that the electrochromic layer is heated by applying an alternating voltage between the pair of power supply sections of each of the paired electrodes so as to put any oppositely disposed positions of the paired electrodes in phase with each other to energize the paired electrodes.

Further features of the present invention will become apparent from the following description of exemplary embodiments with reference to the attached drawings.

DESCRIPTION OF THE EMBODIMENTS

Now, the present invention will be described in greater detail by referring to the accompanying drawings that illustrate currently preferred embodiments of the invention. Note, however, that the configurations of the embodiments and the relative positional arrangements of the components of the embodiments that are described hereinafter do not limit the scope of the present invention unless otherwise noted.

<Electrochromic (EC) Apparatus>

Figure 1:
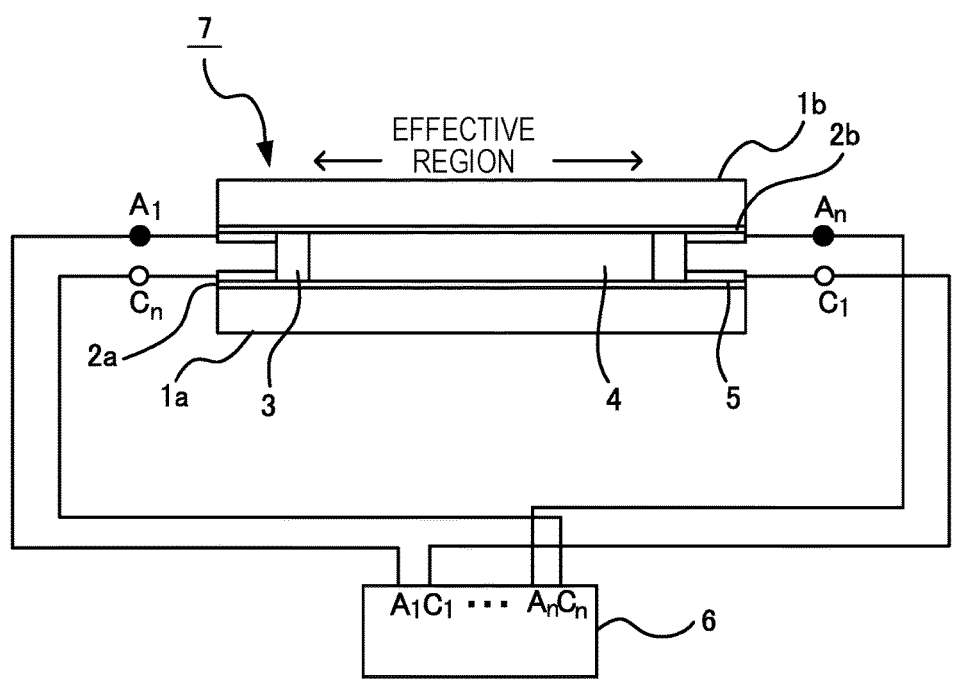
FIG. 1 is a schematic cross-sectional view of an embodiment of EC device according to the present invention.

FIG. 1 is a schematic cross-sectional view of an embodiment of EC apparatus according to the present invention. Referring to FIG. 1, electrodes 2a and 2b are respectively arranged on substrates 1a and 1b. The substrates 1a and 1b are bonded to each other by way of a seal 3 containing gap control particles (not shown) and an EC layer 4 that contains at least an EC material and a solvent is arranged between the pair of electrodes 2a and 2b. The electrodes 2a and 2b are provided with at least a pair of power supply terminals A1, A2, . . . , An−1, An (anodes) and C1, C2, . . . , Cn−1, Cn (cathodes) (where n is an integer not smaller than 2). Each of the power supply terminals is connected to a low resistance wiring 5 arranged outside the effective region on the related one of the paired electrodes to form at least a pair of power supply sections. Each of the power supply terminals A1, A2, . . . , An−1, An and C1, C2, . . . , Cn−1, Cn are connected to a drive unit 6 that includes a drive circuit board. Thus, the device is driven to operate as a voltage pulse is applied between each of the pairs of terminals.

<Substrate 1>

Glass substrates are preferably employed for the substrates 1a and 1b. Glass substrates that can be used for the substrates 1a and 1b includes substrates made of optical glass, those made of quartz glass, those made of white glass, those made of soda lime glass, those made of borosilicate glass, those made of alkali-free glass and those made of chemically reinforced glass, of which substrates made of alkali-free glass is preferable for use from the viewpoint of transparency, durability and thermal resistance. The substrates 1a and 1b may suitably be provided with an anti-reflection layer and/or an index matching layer in addition to the electrodes 2a and 2b in order to reduce reflection at the substrate surfaces, at the substrate-electrode interfaces and at the electrode-EC layer interfaces and improve the device transmittance.

<Electrode 2>

The electrodes 2a and 2b are preferably transparent electrodes. Materials that can be used for transparent electrodes include so-called transparent conductive oxides such as tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO) and niobium-doped titanium oxide (TNO).

<Seal 3>

Thermosetting resins and UV-setting resins can be used for the seal 3 and an appropriate material is selected from such materials depending on the process of forming the EC layer, namely the device process to be used for the EC device. Preferably, cell gap control particles for defining the gap separating the pair of substrates are mixed and kneaded with the material of the seal 3.

<EC Layer 4>

The EC layer 4 contains at least an EC material and a solvent and may additionally contain one or more than one benefit agent such as a supporting electrolyte and/or a thickener.

Compounds whose visible light transmittance is modified by reduction/oxidation can suitably be used as EC materials. Of such compounds, the use of organic compounds such as thiophenes, phenazines and bipyridinium salts is preferable.

There are no particular limitations to the solvents that can be used for the EC layer 4 so long as they can dissolve EC materials and benefit agents such as supporting electrolytes, although the use of a solvent that shows high polarity is preferable. More specifically, solvents that can be used for the EC layer 4 include water and polar organic solvents such as methanol, ethanol, propylene carbonate, ethylene carbonate, dimethyl sulfoxide, dimethoxy ethane, γ-butyrolactone, γ-valerolactone, sulfolane, dimethyl formamide, dimethoxy ethane, tetrahydrofuran, acetonitrile, propionitrile, benzonitrile, dimethyl acetoamide, methyl pyrrolidinone and dioxofuran.

There are no particular limitations to the supporting electrolytes that can be used for the EC layer 4 so long as they are ion dissociable salts and dissolve well in the solvent of the EC layer 4, although the use of an electron donating electrolyte is preferable. Examples of such electrolytes include inorganic ion salts such as various alkali metal salts and alkaline earth metal salts, quaternary ammonium salts and cyclic quaternary ammonium salts. More specific examples of such electrolytes include salts of alkali metals of Li, Na and K such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$ and $KCl$ and quaternary and cyclic quaternary ammonium salts such as $(CH_3)_4NBF_4$, $(C_2H_5)_4NBF_4$, $(n-C_4H_9)_4NBF_4$, $(n-C_4H_9)_4NPF_6$, $(C_2H_5)_4NBr$, $(C_2H_5)_4NClO_4$ and $(n-C_4H_9)_4NClO_4$.

As for the thickener, at least a thickener selected from cyanoethyl polyvinyl alcohol, cyanoethyl pullulan and cyanoethyl cellulose can suitable be used. These thickeners are available from Shin-Etsu Chemical as CR-V (cyanoethyl polyvinyl alcohol: softening temperature 20-40° C., dielectric constant 18.9), CR-S (cyanoethyl pullulan: softening temperature 90-100° C., dielectric constant 18.9), CR-C (cyanoethyl cellulose: softening temperature 200° C. or higher, dielectric constant 16) and CR-M (mixture of cyanoethyl pullulan and cyanoethyl polyvinyl alcohol: softening temperature 40-70° C., dielectric constant 18.9), all of which effectively operate as additives that can dissolve the problem of making the conflicting factors of high viscosity over a wide temperature range and high ion conductivity compatible in a well-balanced manner.

Techniques that can be used to form the EC layer 4 include a technique of boring a pair of holes in each of the substrates and filling the holes with the EC medium, a technique of injecting the EC medium in vacuum from a filling hole formed at a lateral side of each of the substrates by patterning using the seal 3 and a technique of filling the EC medium in vacuum simultaneously with the operation of bonding the substrates.

<Power Supply Section>

Figure 2A:
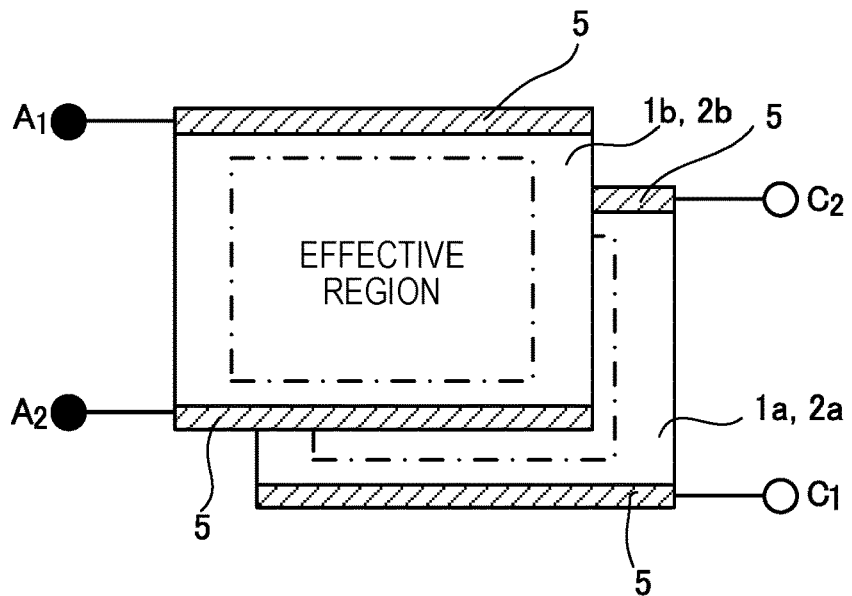
FIGS. 2A and 2B are a schematic illustration of two alternative arrangements of the power supply sections of an EC device according to the present invention.
Figure 2B:
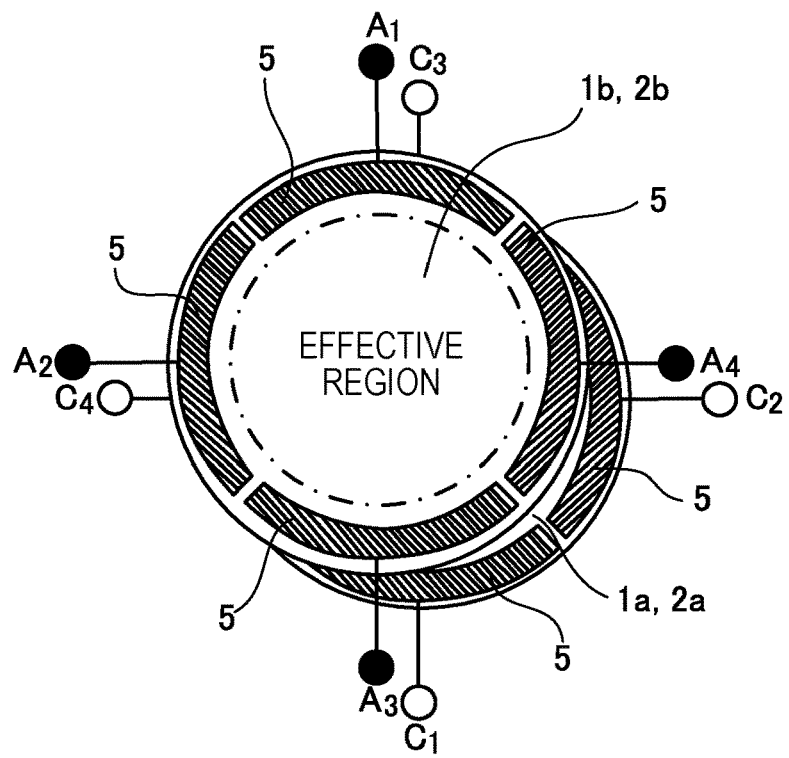

Each of the electrodes 2a and 2b has at least a pair of power supply sections including a first power supply section and a second power supply section that is oppositely arranged relative to the first power supply section. Each of the power supply sections preferably has a power supply terminal and a low resistance wiring 5. FIGS. 2A and 2B are a schematic illustration of two alternative arrangements of the power supply sections of an EC device according to the present invention as viewed in the direction in which the substrates are bonded to each other.

Firstly, the positions of arranging the low resistance wirings 5 and the number of power supply terminals when the electrodes and the device show a substantially quadrangular contour will be described by referring to FIG. 2A. Since the imaging device shows a rectangular contour, the EC device that controls the amount of light entering the imaging device preferably also shows a rectangular contour just like the imaging device. Then, the power supply sections are arranged respectively at the longitudinal or transversal sides of the rectangle for energization of the device. The potential distribution in the effective region is preferably made as small as possible in a normal drive mode when a device coloring/decoloring operation is conducted. For this reason, preferably, the low resistance wirings 5 are arranged respectively along the long sides and power supply terminals are arranged there in order to flow an electric current in the transversal direction. The above statement applies not only to the normal drive mode but also to the heating drive mode when the electrodes are energized to heat the EC layer. In other words, since the electric resistance of the electrodes in the transversal direction is necessarily lower than the electric resistance of the electrodes in the longitudinal direction, a lower voltage may be applied to flow an electric current in the transversal direction when same electric power is employed to heat the EC layer. Therefore, the power supply terminals and the low resistance wiring 5 are preferably arranged as shown in FIG. 2A to flow an electric current between A1 and A2 and between C1 and C2 in the transversal direction. Note that the expression of substantially rectangular contour as used herein includes a rectangular contour whose corners are rounded but that can be regarded as substantially rectangle.

Now, the positions of arranging the low resistance wirings 5 and the number of power supply terminals when the electrodes and the device show a substantially circular contour will be described by referring to FIG. 2B. When the EC device shows a substantially circular contour, each of the low resistance wirings 5 can be divided by an even number and arranging the divided wiring along the circular outer periphery. An optimum divisor needs to be selected by taking the size of the device, the ratio of the solution resistance/electrode resistance and other factors into consideration. When each of the low resistance wirings 5 is divided by four as shown in FIG. 2B, four terminals of A1, A2, A3 and A4 are connected to the electrode 2b (all are anodes), whereas four terminals of C1, C2, C3 and C4 are connected to the electrode 2a (all are cathodes). Note that the expression of substantially circular contour as used herein includes an elliptic contour wherein the difference between the major axis and the minor axis is very small.

In order to suppress the electric potential fall of the low resistance wirings 5 in the longitudinal direction to about 10 mV in a normal drive mode, the sheet resistance of the low resistance wirings 5 is preferably less than $1/100$, more preferably less than $1/500$, of the sheet resistance of the electrodes. Thin film silver wirings formed by vacuum deposition or thick film silver wiring formed by screen printing or inkjet application can suitably be employed for the low resistance wirings 5.

<Drive Method>

According to the present invention, the heating drive method of heating the EC layer by applying an alternating voltage that puts any oppositely disposed positions of the pair of electrodes in phase with each other between a pair of power supply sections is employed. The heating drive is preferably voltage modulation drive. While the timing of execution of heating drive is not subject to any particular limitations, heating drive is preferably executed prior to normal drive, during a pause period of normal drive or when the temperature as detected by the temperature detector for detecting the temperature of the EC device shows a value that is not higher than a predetermined value.

Figure 3:
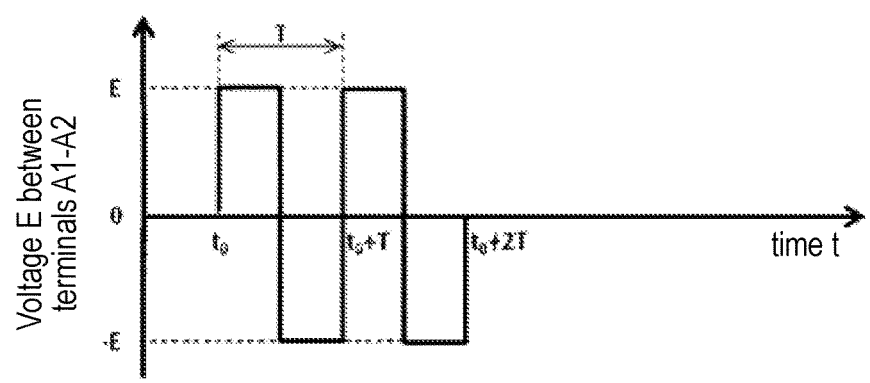
FIG. 3 is a schematic illustration of exemplar voltage waveforms (inter-terminal voltage) that can be employed in a heating drive of the EC device of FIG. 2A.
Figure 3:
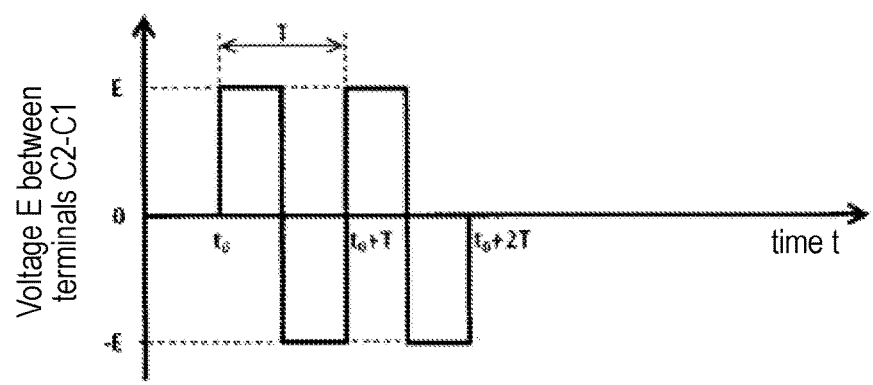

FIG. 3 is a schematic illustration of exemplar voltage waveforms (inter-terminal voltage) that can be observed during the period when normal drive of the EC device of FIG. 2A is not executed (during a non-coloring operation), which may typically be a period prior to the execution of normal drive. The reason why the voltage waveform of an alternating voltage that puts any oppositely disposed positions of the pair of electrodes in phase with each other is preferably applied between A1 and A2 and between C1 and C2 will be described below.

To begin with, assume that a voltage that can heat the EC layer is applied to one of the electrodes. If, for example, +3 V is applied to the A1 terminal and 0 V is applied to the A2 terminal, the inter terminal potential difference is greater than the coloring drive voltage in a normal drive mode so that the anodic material and the cathodic material are separately colored in the electrode surface. More specifically, the anodic material is colored at the side of the high potential A1 terminal, whereas the cathodic material is colored at the side of the low potential A2 terminal. Since a high voltage higher than the coloring drive voltage in a normal drive mode is applied at this time, the EC molecules are subjected to higher order oxidation and higher order reduction so as to get into an unstable state. Therefore, degradation of the material is feared particularly when the voltage is applied for a prolonged period of time. As a positive voltage pulse and a reverse voltage pulse of short duration having the same wave height and the same pulse width are alternately applied, the time during which the EC molecules exist as unstable chemical species while utilizing a self-decoloring reaction can be made to be substantially equal to nil in the sense that the device is not colored.

Now, assume here that a voltage that can heat the EC layer is applied to both of the paired electrodes. Attention needs to be paid to the fact that, when the electric potential difference between the two electrodes is substantially equal to the coloring drive voltage at any arbitrarily selected point in the surfaces of the electrodes, coloring occurs so that a normal drive operation and a heating drive operation cannot be executed independently. For this reason, the voltage waveform of an alternating voltage that puts any oppositely disposed positions of the pair of electrodes in phase with each other is preferably applied between A1 and A2 and between C1 and C2.

The voltage wave height and the pulse width that are applicable to heating drive are respectively preferably between about 1 V and about 10 V and preferably not greater than 100 ms, more preferably not greater than 100 µs, although the preferable voltage can vary depending on the electric resistance of each of the electrodes.

Figure 4:
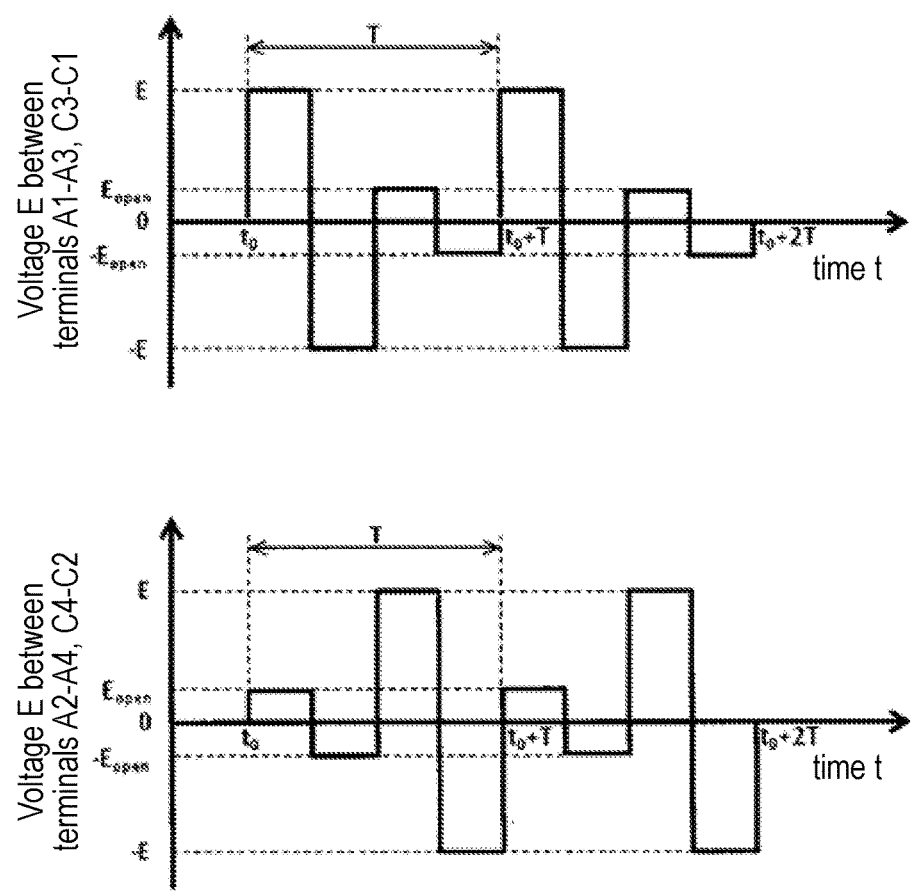
FIG. 4 is a schematic illustration of exemplar voltage waveforms (inter-terminal voltage) that can be employed in a heating drive of the EC device of FIG. 2B.

FIG. 4 is a schematic illustration of exemplar voltage waveforms (inter-terminal voltage) that can be employed in a heating drive of the EC device of FIG. 2B during a non-coloring operation.

An alternating voltage is preferably applied between the terminals of A1 and A3, between the terminals of C3 and C1, between the terminals of A2 and A4 and also between the terminals of C4 and C2 as shown in FIG. 4 so as to put any oppositely disposed positions of the pair of electrodes in phase with each other as described above and as shown in FIG. 3. Note that $E_{open}$ is the open-circuit voltage which is subsequently equal to nil in this instance. From the viewpoint of uniformly heating the EC layer, the voltage applications of the two systems are preferably alternately conducted for the same duration of time as shown in FIG. 4. More specifically, when there are N+1 pairs of power supply sections (where N is an integer not smaller than 1), voltage pulses having the same waveform are preferably applied with a phase difference of $2\pi/(N+1)$ radians respectively to the pairs of power supply sections.

The voltage waveforms of the voltages to be applied to the respective terminals of the EC device shown in FIG. 2A in order to start a heating drive operation during a normal drive operation will be described below by referring to FIG. 5.

In a normal drive mode, an arbitrary optical density ($0 \leq \Delta OD \leq \Delta OD_{max}$) can be selected by way of pulse width modulation drive with a voltage wave height of $E_{drive}$ and a constant period of T ($0 \leq t \leq T$). With this arrangement, the pause period (non-coloring time) per cycle period is T-t and a heating drive operation can be conducted in this pause period. Therefore, the time during which a heating drive operation can be conducted in a cycle period depends on the selected optical density. However, considering the fact that a satisfactory optical density can be obtained by selecting a high concentration for the EC material and a voltage up to about 10V can be selected for the heating voltage, it will be understood that heating drive can be controlled substantially independently from normal drive. Thus, any form of normal drive can be used so long as it utilizes the pause period for the selection of optical density. More specifically, of the pair of power supply terminals arranged for each of the paired electrodes, one may be selected (e.g., the A1 terminal and the C1 terminal) for a drive operation as shown in FIG. 5. Alternatively, the A2 terminal and the C2 terminal may additionally be used to realize an alternating drive with the two combinations of power supply terminals.

A voltage with a constant period T' and a variable voltage wave height can suitably be used for a heating drive operation to be conducted during a pause period (non-coloring time). In view of that the drive frequency of normal drive is about 10 kHz, about ten times of the drive frequency of heating drive, or a drive frequency of not smaller than 100 kHz (period not larger than 10 µs), is preferably selected for the drive frequency of heating drive from the viewpoint of temperature control.

Figure 5:
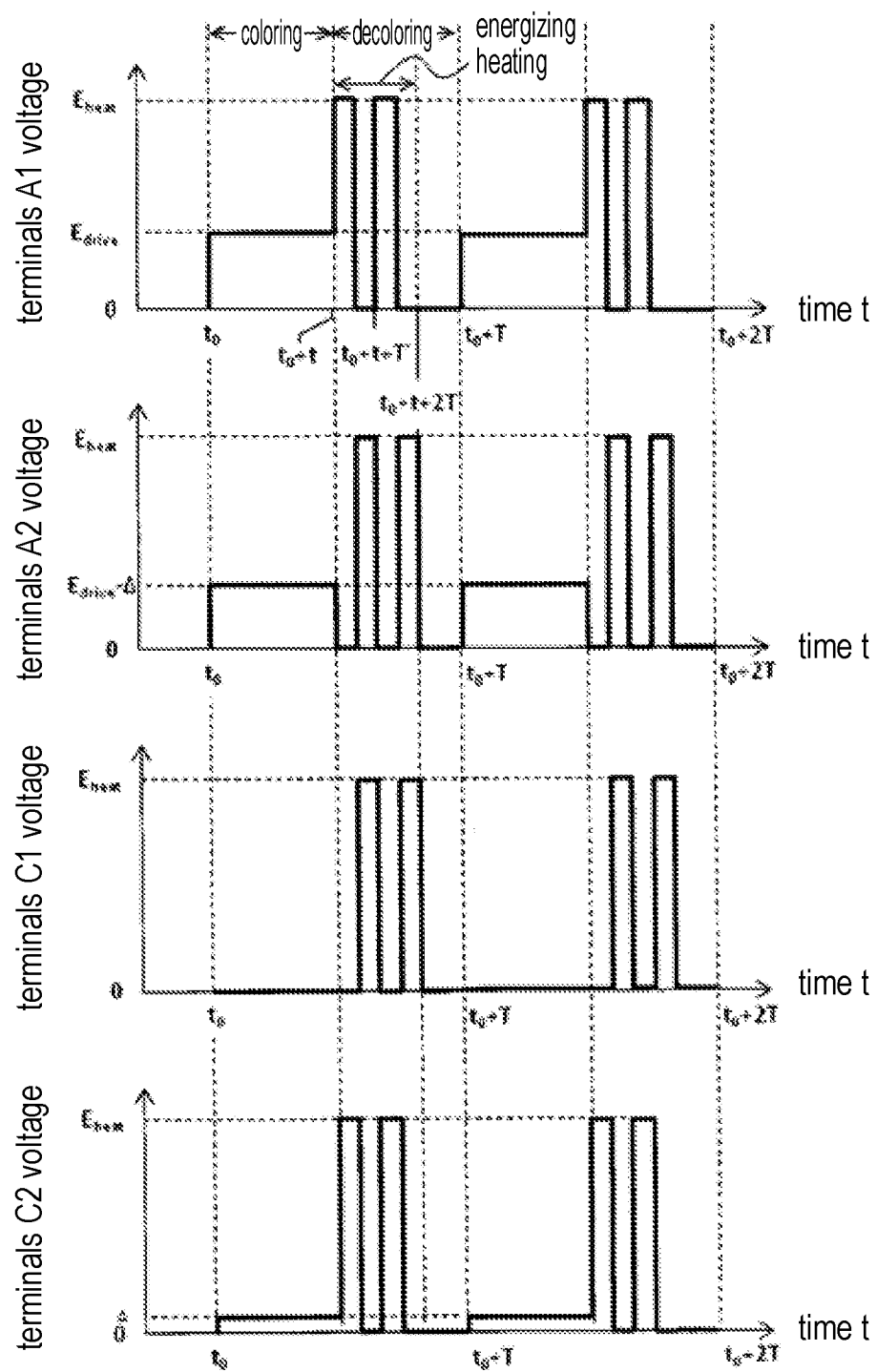
FIG. 5 is a schematic illustration of exemplar waveforms of the voltages that can be applied to the respective terminals of the EC device of FIG. 2A in a heating drive of the EC device.

FIG. 5 shows an instance where a heating drive operation is conducted for 2T' minutes within a pause period of T-t. However, a similar result can be obtained by conducting a heating drive operation throughout the pause period with a reduced heating voltage.

<Application Etc. Of EC Device>
<Optical Filter>

An optical filter according to the present invention comprises an EC apparatus according to the present invention and an active device connected to the EC device that the EC apparatus has. The active device drives the EC device to adjust the amount of light that passes through the EC device. Examples of active device that can be used for such an application include an amplifier device and a switching device. More specific examples include a transistor and an MIM device.

<Lens Unit>

A lens unit according to the present invention comprises an optical filter according to the present invention and an imaging optical system. The optical filter can adjust the amount of light that is passing through or that has passed through the imaging optical system. The imaging optical system is a group of lenses including a plurality of lens elements. The optical filter that the optical unit has may be arranged between a lens and another lens in the lens unit or fitted to the outside of the lens unit.

<Imaging Apparatus>

An imaging apparatus according to the present invention comprises an optical filter according to the present invention and an imaging device for receiving the light that has been transmitted through the optical filter. When an optical filter according to the present invention is employed in an imaging apparatus, which may typically be a camera, the amount of light can be reduced without lowering the gain of the imaging device.

Figure 6A:
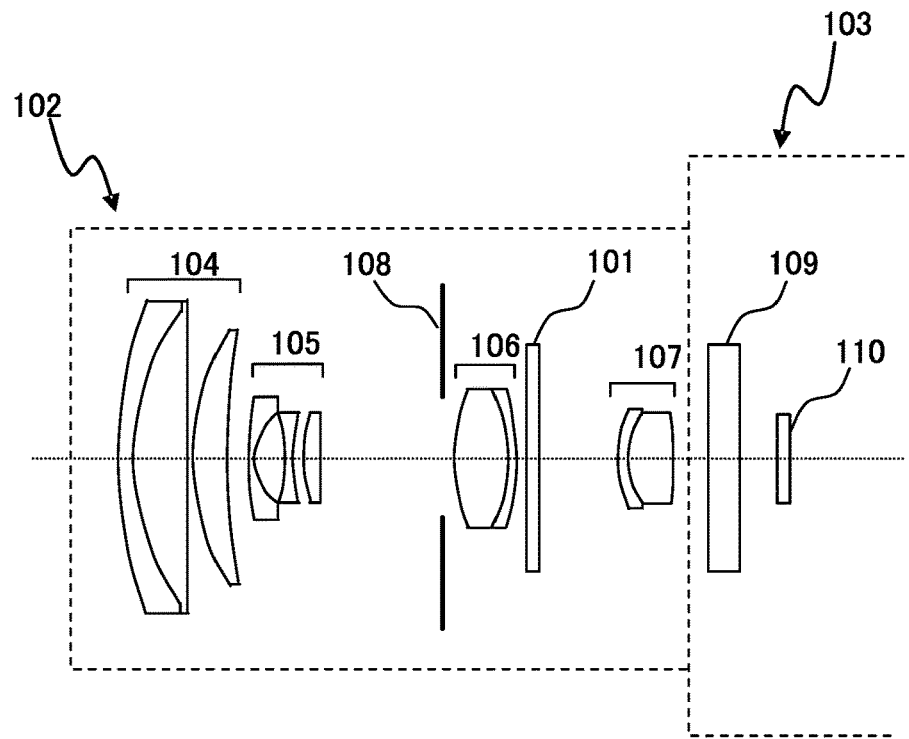
FIGS. 6A and 6B are schematic cross-sectional views of two embodiments of imaging apparatus according to the present invention.
Figure 6B:
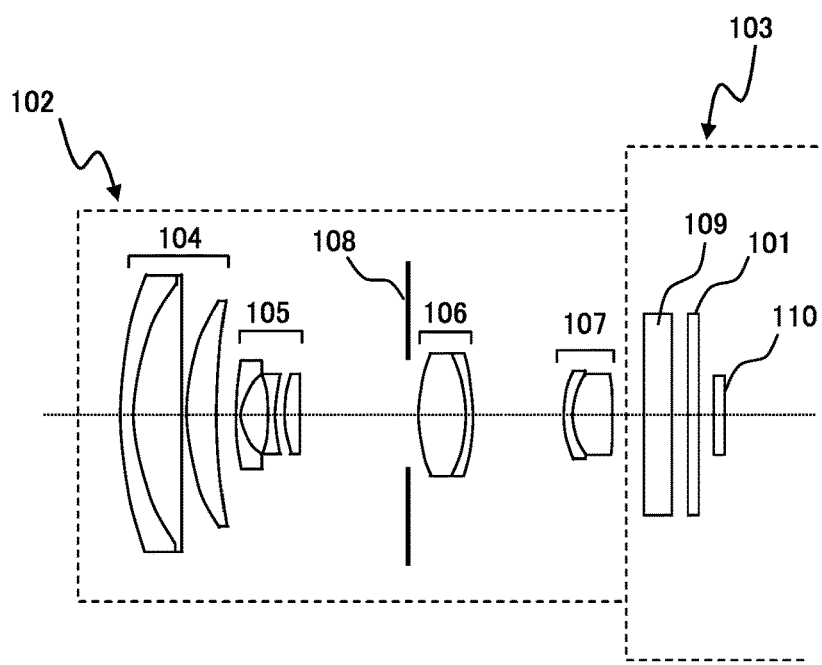

FIGS. 6A and 6B are a schematic illustration of two modes of embodying an imaging apparatus according to the present invention. FIG. 6A illustrates an imaging apparatus having a lens unit realized by using an optical filter according to the present invention and FIG. 6B illustrates an imaging apparatus comprising an optical filter according to the present invention. As shown in FIGS. 6A and 6B, lens unit 102 is detachably connected to imaging unit 103 by way of a mount member (not shown).

The lens unit 102 is a unit having a plurality of lenses, or lens groups. Referring to FIG. 6A, for example, the lens unit 102 shows a rear focusing type zoom lens that operates for focusing behind the aperture. In FIG. 6A, there are shown four lens groups including a first lens group 104 having positive refractive power, a second lens group 105 having negative refractive power, a third lens group 106 having positive refractive power and a fourth lens group 107 having positive refractive power that are arranged sequentially in the above-mentioned order as viewed from the subject side (the left side in FIG. 6A). The gap between the second lens group 105 and the third lens group 106 is made to vary for zooming and the position of the fourth lens group 107 is shifted for focusing. The lens unit 102 typically has an aperture stop 108 arranged between the second lens group 105 and the third lens group 106 and an optical filter 101 arranged between the third lens group 106 and the fourth lens group 107. The lens groups 102 through 107, the aperture stop 108 and the optical filter 101 are so arranged that the rays of light that pass through the lens unit 102 actually pass through the above listed components of the lens unit 102 and the amount of light can be adjusted by means of the aperture stop 108 and the optical filter 101.

The configuration of the lens unit 102 can appropriately be modified. For example, the optical filter 101 may be arranged in front (at the subject side) of or behind (at the side of the imaging unit 103 of) the aperture stop 108 and further in front of the first lens group 104 or behind the fourth lens group 107. The optical filter 101 arranged at a position where rays of light converge provides an advantage that the surface area of the optical filter 101 can be reduced. The form of the lens unit 102 can also appropriately be selected. In other words, the lens unit 102 may be of the rear focusing type, of the inner focusing type where focusing of light is realized at a forward position relative to the position of the aperture or of any other type. Additionally, the zoom lens may be replaced by a special lens such as a fisheye lens or a macro lens.

Glass block 109 that the imaging unit 103 has is a glass block such as a low pass filter, a face plate or a color filter. The imaging device 110 operates as a sensor section for receiving the rays of light that have passed through the lens unit 102 and a CCD or a CMOS can advantageously be used for the imaging device 110. An optical sensor such as a photodiode that can acquire and output information on the strength or the wavelength of light may appropriately and alternatively be utilized.

When the optical filter 101 is incorporated into the lens unit 102 as shown in FIG. 6A, the drive unit may be arranged at the inside of the lens unit 102 or at the outside of the lens unit 102 and, for example, in the imaging unit 103. When the optical filter 101 is arranged at the outside of the lens unit 102, the EC device and the drive unit that are respectively located at the inside and at the outside of the lens unit 102 are connected to each other by way of wiring and driven under control.

The imaging unit 103 may be made to contain an optical filter 101 according to the present invention as shown in FIG. 6B. In such an instance, the optical filter 101 is arranged at an appropriate position in the inside of the imaging unit 103. More specifically, the imaging device 110 is only required to be arranged at a position good for receiving the rays of light that have passed through the optical filter 101. In FIG. 6B, the optical filter 101 is typically arranged right in front of the imaging device 110. When the imaging unit 103 contains an optical filter 101, the lens unit 102 that is connected to the imaging unit 103 is not required to be provided with an optical filter 101 so that the imaging apparatus can be formed by using an existing lens unit. Such an imaging apparatus can also control light in the inside.

An imaging apparatus according to the present invention and having a configuration as described above can find applications in the field of products having an amount of light adjusting feature and an imaging device containing feature in combination. More specifically, an imaging apparatus according to the present invention can be used in various products including cameras, digital cameras, video cameras and digital video cameras. Furthermore, an imaging apparatus according to the present invention can also find applications in the field of products that contains an imaging apparatus such as mobile phones including smart phones, PCs and tablet-type devices.

An imaging apparatus according to the present invention can variably control the amount of light by means of a single filter as it employs an optical filter according to the present invention as a light control member. Thus, an imaging apparatus according to the present invention provides an advantage of reducing the number of component members and a space saving advantage.

<Window Member>

A window member according to the present invention comprises an EC apparatus according to the present invention and an active device connected to the EC device that the EC apparatus comprises. The active device drives the EC device and regulates the amount of light that passes through the EC device. The active device may typically be an amplifier device or a switching device. Specific examples of active device that can be used for the purpose of the present invention include a transistor and an MIM device.

Figure 7A:
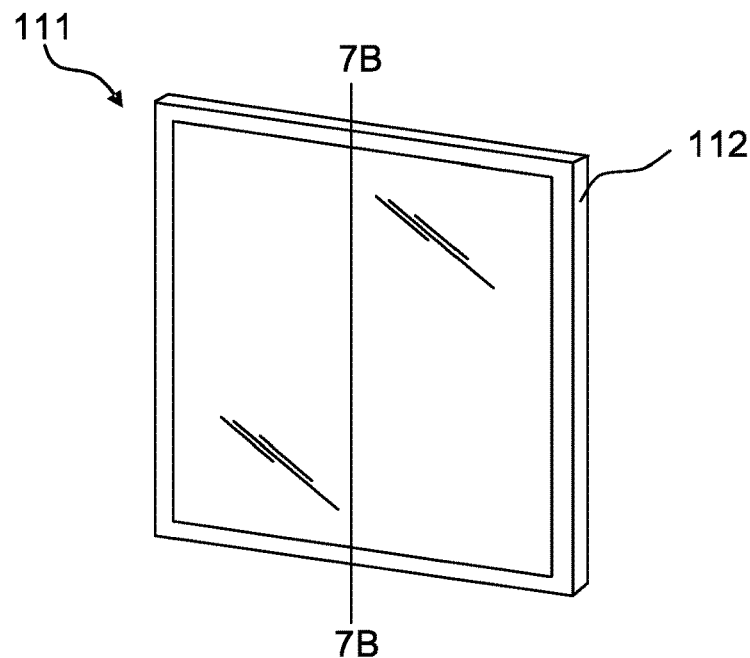
FIGS. 7A and 7B are a schematic illustration of an embodiment of window member according to the present invention.
Figure 7B:
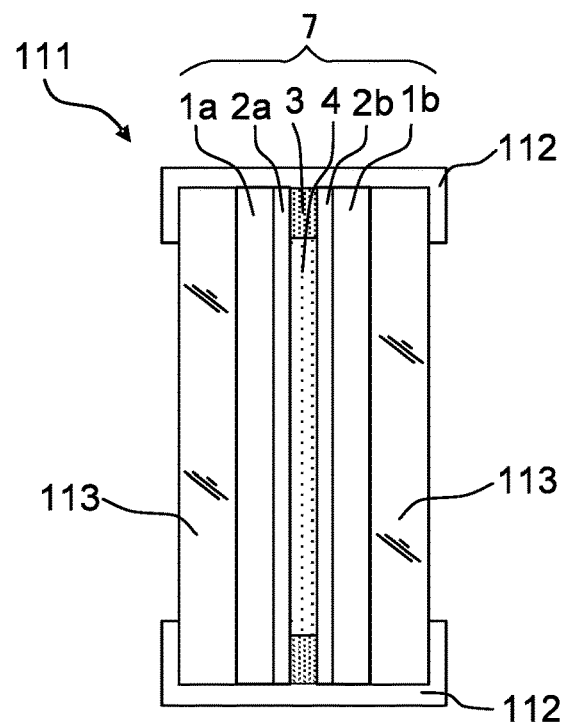

FIGS. 7A and 7B are a schematic illustration of an embodiment of window member according to the present invention. FIG. 7A is a perspective view of the window member and FIG. 7B is a cross-sectional view of the window member taken along line 7B-7B in FIG. 7A. The window member 111 in FIGS. 7A and 7B is a light control window and comprises an EC device 7, a pair of transparent plates 113 sandwiching the EC device 7 between them and a frame 112 arranged around the EC device 7 and the pair of transparent plates 113 to produce a window member 111 as an integrated object. The drive unit may be integrally arranged in the inside of the frame 112 or arranged outside of the frame 112 and connected to the EC device by way of wiring.

The transparent plates 113 are not subject to any particular limitations so long as they are made of a material showing a high transmittance, although they are preferably made of a glass material from the viewpoint of utilizing the window member as an actual window. While the EC device 7 is shown as a component independent of the transparent plates 113 in FIGS. 7A and 7B, for example, the substrates $1a$ and $1b$ of the EC device 7 may be made to operate as transparent plates 113.

The frame 112 may be made of any appropriate material, the frame 112 may be such a member that covers at least part of the EC device 7 and makes the window member appear as an integrated object.

A light control window as described above can be used to regulate the amount of sun light entering a room per unit time during the day time provided that the room is equipped with the light control window. Since such a window can be used to not only regulate the amount of sun light that enters a room per unit time but also regulate the amount of heat that enters a room per unit time, it can be used to control both the luminance and the temperature in a room. Additionally, such a light control window can also be used as a shutter for intercepting the view of the room provided with the light control window that can be observed from the outside of a room. Possible applications of such a light control window include glass windows of buildings, windows of moving vehicles such as automobiles, trains, airplanes and ships and filters of display surfaces of watches, clocks and mobile phones.

EXAMPLES

Now, EC apparatus according to the present invention will be described further by way of examples.

Example 1

An EC device as shown in FIGS. 1 and 2A were prepared in Example 1. A pair of 0.7 mm-thick glass substrates (EAGLE-XG: trade name, available from Corning) were used as substrates 1a and 1b. ITO transparent electrodes having a sheet resistance of 10Ω/□ were formed respectively on the substrates as electrodes 2a and 2b. Then, the substrates carrying the transparent electrodes were employed as a pair of transparent electrode substrates.

The EC device of this example has a rectangular outer contour as viewed in the perpendicular direction relative to the surfaces of the substrates of the EC device. Thus, low resistance wirings 5 are formed respectively along the long sides of the device and outside the effective region. More specifically, the low resistance wirings 5 were silver thick films formed by screen printing, using silver nanoparticle paste, and showing a sheet resistance of 6.6 mΩ/□ (film thickness 5 μm). The sheet resistivity ratio of each of the low resistance wirings 5 relative to the corresponding electrode 2a or 2b was not greater than 1/1,000.

Gap control particles (Micropearl-SP (diameter 30 μm): trade name, available from Sekisui Chemical) and thermosetting epoxy resin (STRUCTBOND HC-1850: trade name, available from Mitsui Chemicals) were mixed and kneaded. Then, a seal pattern having an opening for EC medium injection was drawn on one of the transparent electrode substrates by applying the kneaded mixture by means of a dispenser device and bonded to the other transparent electrode substrate to produce a device having an inter-electrode gap of 30 μm. The effective region of the device was made to be equal to 11×18 mm except the portion for EC medium injection.

The EC medium was prepared by dissolving anodic EC material A (a fenadine) expressed by the structural formula (A) shown below and cathodic EC material B (a bipyridinium salt) expressed by the structural formula (B) shown below in propylene carbonate solvent. Both the concentration of the anodic EC material A and that of the cathodic EC material B were made to be equal to 100 mM.

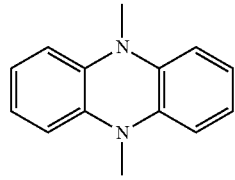

(A)

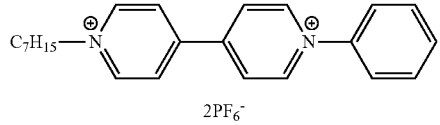

(B)

The EC medium was then filled in the prepared device by means of vacuum injection by way of the opening formed there and then the opening was sealed by means of UV-setting type epoxy resin. Additionally, a lead wire was soldered to each of the low resistance wirings 5 to produce an EC device having terminals, to which respective voltages can be applied independently.

[Device Evaluation]

The prepared EC device was put in an apparatus that can evaluate the electrochemical characteristic, the optical characteristic and the temperature characteristic simultaneously to evaluate the characteristics of the EC device.

Figure 8:
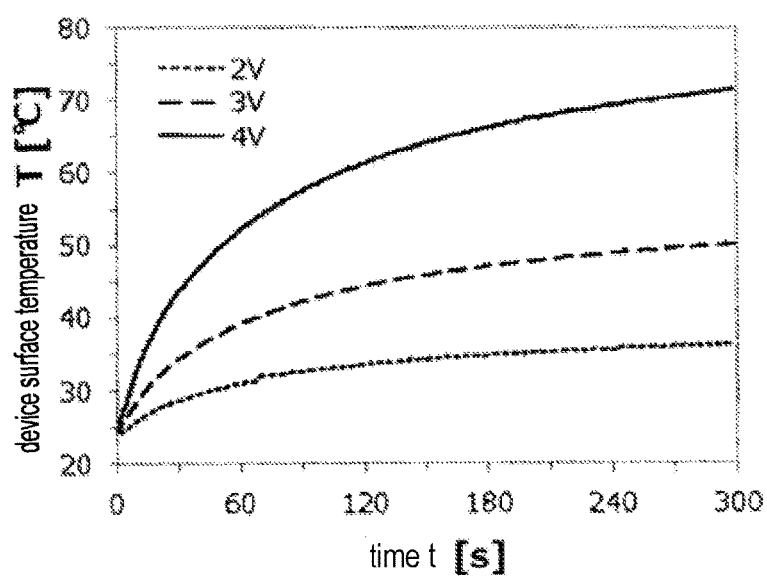
FIG. 8 is a graph illustrating the changes observed in the device surface temperature of the EC device according to the present invention that was used in Example 1.
Figure 9A:
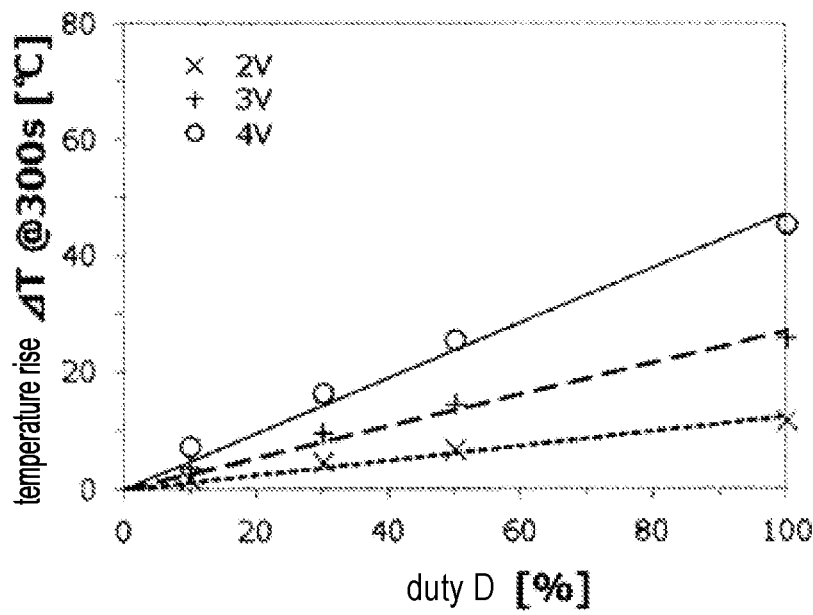
FIGS. 9A and 9B are graphs illustrating the device temperature rises observed in EC device according to the present invention that was used in Example 1.
Figure 9B:
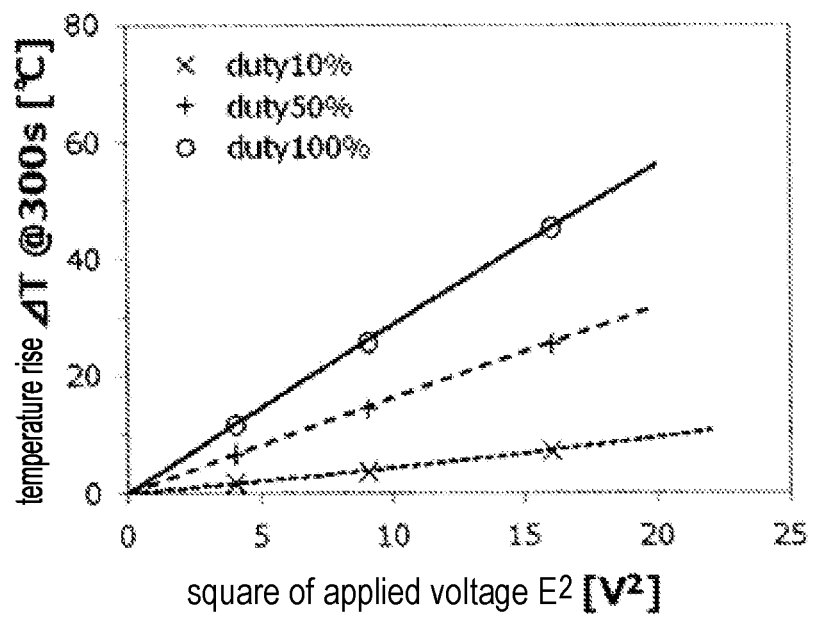
Figure 10:
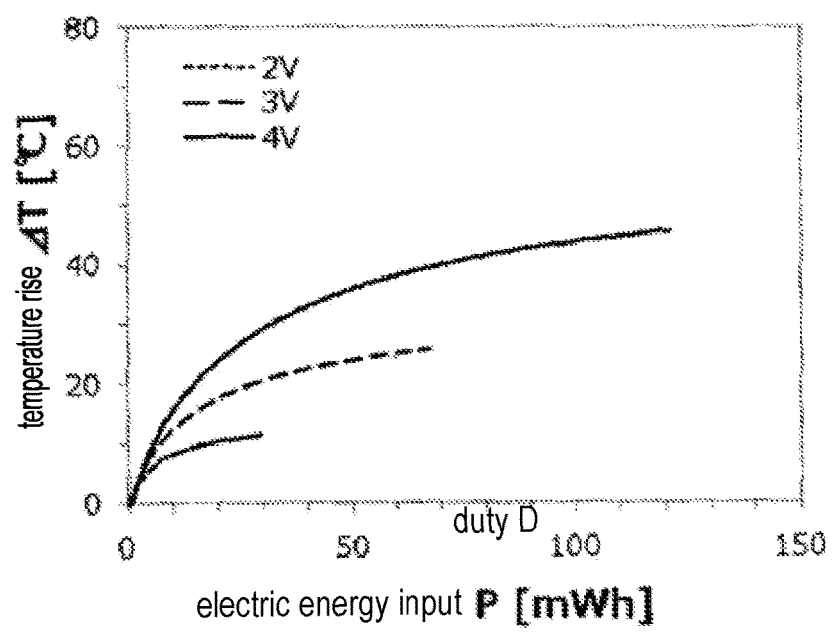
FIG. 10 is a graph illustrating the device temperature rises observed in the EC device according to the present invention that was used in Example 1.

Firstly, in the non-coloring period prior to a normal drive operation, the temperature changes of the device that took place when a heating drive operation (drive frequency 100 kHz, duty 100%) was conducted with a varying wave height value of the heating voltage were measured. As shown in FIG. 8, the rise of the device temperature with time was observed. For example, it was found that, with 4 V, a temperature rise ΔT of not less than 25° C. can be achieved in a minute. Then, the temperature rise was observed for each of the applied voltages with varied duties. From the viewpoint of duty, the temperature rise was linear regardless of the voltage as seen from FIG. 9A. From the viewpoint of voltage, the temperature rise was proportional to the square of the applied voltage regardless of the duty as seen from FIG. 9B. With regard to the temperature rise relative to the input power for each of the voltages, while the temperature rise did not depend on the applied voltage when the input power is small as shown in FIG. 10, the higher the applied voltage the greater the temperature rise when the input power is large to prove that the EC layer was efficiently heated.

For the purpose of comparison, the temperature rise of the device was observed also when no heating drive operation was conducted to find that the temperature rise was smaller than 1° C.

Besides, no change in the transmittance was observed during the heating drive operation. Similarly, no change in the current-voltage characteristic was observed and no degradation of the characteristics of the device was noticed before and after the heating drive operation.

Example 2

An EC device was prepared as in Example 1 except that the low resistance wirings 5 of this example were formed as silver thin films having a sheet resistance of 16 mΩ/□ (film thickness 1.2 μm) by means of sputtering. Note that a 50 nm-thick titanium thin film was additionally formed as undercoat layer for the purpose of improving the tight adhesion of the silver thin film. The sheet resistance ratio of the silver wiring relative to the ITO electrode was 1/625.

[Device Evaluation]

The prepared EC device was put in an apparatus similar to the one used in Example 1 and then entire apparatus was put into a thermostatic chamber to evaluate the characteristics of the device.

To begin with, the temperature of the thermostatic chamber was set to −5° C. and, after the device temperature was satisfactorily stabilized, the device was driven to operate by heating drive (voltage 3 V, drive frequency 100 kH, duty 100%) in an uncolored state to raise the device temperature to about 20° C. Subsequently, the device was driven to operate both by normal drive and by heating drive. More specifically, the normal drive was conducted with voltage 0.75 V, drive frequency 10 kHz and duty 90% and the heating drive was conducted during the pause period of the normal drive with duty 10% and drive frequency 100 kHz. The optical density of the device was 1.8, which indicated a dimmed state with a density lowered by about 6 steps. At this time, 6 V and 3 V were selected for the heating voltage and additionally an instance where no heating drive was conducted was also evaluated for the purpose of comparison. Table 1 collectively shows the voltages applied to the terminals when the heating voltage was 3 V. The voltages shown in Table 1 also apply to the heating drive where the heating voltage was 6 V.

TABLE 1

|  | Normal drive (90 μs) | Heating drive (10 μs) | Normal drive (90 μs) | Heating drive (10 μs) |
| --- | --- | --- | --- | --- |
| A1 terminal | +0.75 V | 3 V (5 μs)/ 0 V (5 μs) | open-circuit potential (+0.71 V) | 3 V (5 μs)/ 0 V (5 μs) |
| A2 terminal | open-circuit potential (+0.71 V) | 0 V (5 μs)/ 3 V (5 μs) | +0.75 V | 0 V (5 μs)/ 3 V (5 μs) |
| C1 terminal | 0 V | 0 V (5 μs)/ 3 V (5 μs) | open-circuit potential (+0.04 V) | 0 V (5 μs)/ 3 V (5 μs) |
| C2 terminal | open-circuit potential (+0.04 V) | 3 V (5 μs)/ 0 V (5 μs) | 0 V | 3 V (5 μs)/ 0 V (5 μs) |

Figure 11:
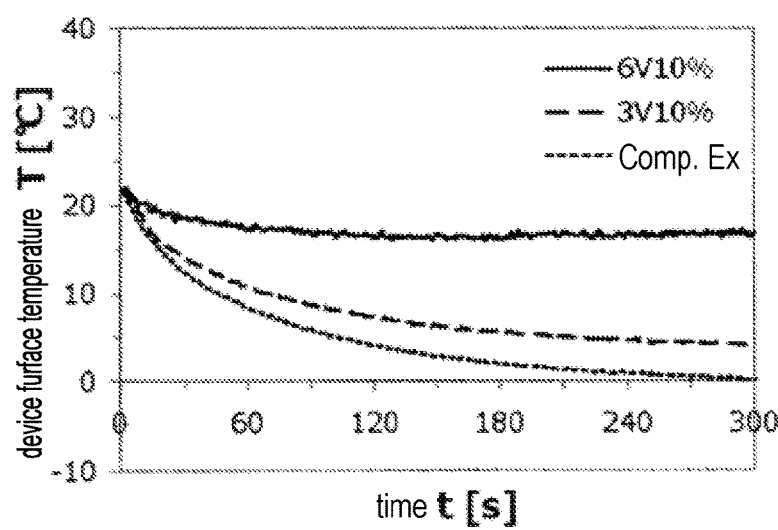
FIG. 11 is a graph illustrating the changes observed in the device surface temperature of the EC device according to the present invention that was used in Example 2.

The changes in the device temperature were shown in FIG. 11. In the instance where no heating drive was conducted (Comparative Example), the device temperature fell from about 20° C. to 0.5° C. in 300 s, whereas, in the instance where 3V heating drive was conducted, the device temperature was 4.1° C. and, in the instance where 6 V heating drive was conducted, the device temperature was 17.2° C. to prove that the device temperature can be maintained by heating drive. Additionally, the device temperature fall entailed a change in the optical density in the instance where no heating drive was conducted, whereas the change in the optical density was very slight in the instances where heating drive was conducted. After conducting a normal drive operation and a heating drive operation for 300 s, a decoloring operation was executed and the decoloring response was observed for each of the drive conditions to find that the decoloring response time was 2.2 s for 6 V heating drive, 3.1 s for 3 V heating drive and 4.0 s for no heating drive to prove that a short response time can be achieved by heating drive.

Furthermore, neither any abnormal coloring and nor any changes in the current-voltage characteristic before and after a heating drive were observed in this example except the change in the optical density that accompanied the change in the device temperature. This fact proved that there was no degradation of the characteristics of the EC device.

ADVANTAGES OF THE INVENTION

As described above, an EC layer can be heated without coloring the device. Thus, the present invention can provide an EC apparatus showing an excellent response time in a low temperature environment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-055343, filed Mar. 22, 2017, which is hereby incorporated by reference herein in its entirety.

What is claimed is:

1. An electrochromic apparatus comprising an electrochromic device and a drive unit operating for normal drive and heating drive of the electrochromic device,
    the electrochromic device comprising a pair of oppositely disposed electrodes and an electrochromic layer arranged between the pair of electrodes,
    the electrochromic layer including at least an electrochromic material and a solvent,
    each of the paired electrodes having at least a pair of power supply sections on a surface thereof,
    the pair of power supply sections including a first power supply section and a second power supply section arranged oppositely relative to the first power supply section on the surface,
    wherein the drive unit is configured to operate for the heating drive such that the electrochromic layer is heated by applying an alternating voltage between the pair of power supply sections of each of the paired electrodes so as to put any oppositely disposed positions of the paired electrodes in phase with each other.

2. The electrochromic apparatus according to claim 1, wherein
    each of the paired electrodes has N+1 pairs of power supply sections (n being an integer not smaller than 1) and the drive unit operates for the heating drive by applying a voltage pulse to each of the N+1 pairs of power supply sections, and wherein
    the voltage pulses applied to the respective pairs of power supply sections commonly have the same waveform and have phases shifted by $2\pi/(N+1)$ radians from each other.

3. The electrochromic apparatus according to claim 1, wherein
    the drive unit operates for the heating drive by way of voltage modulation.

4. The electrochromic apparatus according to claim 1 wherein
    the drive unit operates for the heating drive prior to the normal drive.

5. The electrochromic apparatus according to claim 1, wherein
    the drive unit operates for the heating drive during a pause period of the normal drive.

6. The electrochromic apparatus according to claim 1, further comprising a temperature detector for detecting a temperature of the electrochromic device, wherein the drive unit operates for the heating drive when the temperature detected by the temperature detector shows a value not higher than a predetermined value.

7. The electrochromic apparatus according to claim 1, wherein each of the paired electrodes has a rectangular contour and the pair of power supply sections on the surface include a pair of low resistance wirings arranged respectively along the oppositely disposed long sides of the electrode and a pair of power supply terminals connected respectively to the pair of low resistance wirings.

8. The electrochromic apparatus according to claim 1, wherein each of the paired electrodes have a circular contour and the pair of power supply sections on the surface include a pair of low resistance wirings arranged respectively along the outer periphery of the electrode and disposed oppositely relative to each other and a pair of power supply terminals connected respectively to the paired low resistance wirings.

9. The electrochromic apparatus according to claim 7, wherein the sheet resistance of the low resistance wirings is less than 1/100 of the sheet resistance of the electrodes.

10. The electrochromic apparatus according to claim 1, wherein the electrochromic material is an organic compound.

11. The electrochromic apparatus according to claim 1, wherein the drive unit operates for the heating drive by alternately applying a positive voltage pulse and a reverse voltage pulse having the same wave height and the same pulse width between the paired power supply sections.

12. An optical filter comprising an electrochromic apparatus according to claim 1 and an active device connected to the electrochromic device that the electrochromic apparatus has.

13. The optical filter according to claim 12, wherein the active device operates to drive the electrochromic device and controls the amount of light passing through the electrochromic device.

14. A lens unit comprising an optical filter according to claim 12 and an imaging optical system including a plurality of lenses.

15. An imaging apparatus comprising an optical filer according to claim 12 and an imaging device for receiving the light that has passed through the optical filter.

16. A window member comprising an electrochromic apparatus according to claim 1 and an active device connected to the electrochromic device that the electrochromic apparatus has.

17. The window member according to claim 16, wherein the active device operates to drive the electrochromic device and controls the amount of light passing through the electrochromic device.

18. A method of driving an electrochromic device comprising a pair of oppositely disposed electrodes and an electrochromic layer arranged between the pair of electrodes, the electrochromic layer including at least an electrochromic material and a solvent, each of the paired electrodes having at least a pair of power supply sections on a surface thereof, the pair of power supply sections including a first power supply section and a second power supply section arranged oppositely relative to the first power supply section on the surface, the method including a step of driving the electrochromic device to operate such that the electrochromic layer is heated by applying an alternating voltage between the pair of power supply sections of each of the paired electrodes so as to put any oppositely disposed positions of the paired electrodes in phase with each other to energize the paired electrodes.

* * * * *